(12) United States Patent
Jacobsen et al.

(10) Patent No.: US 12,732,924 B2
(45) Date of Patent: Sep. 8, 2026

(54) METHOD FOR DETERMINING PROPAGATION DELAYS

(71) Applicant: Nokia Technologies Oy, Espoo (FI)

(72) Inventors: Thomas Haaning Jacobsen, Aalborg (DK); Samantha Caporal Del Barrio, Aalborg (DK); Simon Svendsen, Aalborg (DK); Troels Emil Kolding, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 337 days.

(21) Appl. No.: 18/552,487

(22) PCT Filed: Dec. 2, 2021

(86) PCT No.: PCT/FI2021/050835
§ 371 (c)(1),
(2) Date: Sep. 26, 2023

(87) PCT Pub. No.: WO2022/207959
PCT Pub. Date: Oct. 6, 2022

(65) Prior Publication Data

US 2024/0121728 A1 Apr. 11, 2024

(30) Foreign Application Priority Data

Mar. 29, 2021 (FI) ..................................... 20215363

(51) Int. Cl.
*H04W 52/36* (2009.01)
*H04B 17/364* (2015.01)

(52) U.S. Cl.
CPC ........ *H04W 52/367* (2013.01); *H04B 17/364* (2015.01)

(58) Field of Classification Search
CPC .. H04B 17/364; H04B 7/0608; H04B 7/0691; H04B 7/06952; H04B 7/088; H04B 17/327; H04W 52/367; H04W 56/0065
See application file for complete search history.

(56) References Cited

U.S. PATENT DOCUMENTS 10,812,125 B1 10/2020 Badic et al.
12,095,530 B2 * 9/2024 Grieco ................ H04W 52/367
(Continued)

FOREIGN PATENT DOCUMENTS

WO 2021/030605 A1 2/2021
WO 2022/122333 A1 6/2022

OTHER PUBLICATIONS

"3rd Generation Partnership Project; Technical Specification Group Radio Access Network; NR; Medium Access Control (MAC) protocol specification (Release 16)", 3GPP TS 38.321, V16.2.1, Sep. 2020, pp. 1-154.
(Continued)

*Primary Examiner* — Kathy W Wang-Hurst
*Assistant Examiner* — Garth D Richmond
(74) *Attorney, Agent, or Firm* — Carter, DeLuca & Farrell LLP

(57) ABSTRACT

An apparatus comprising: means for measuring a downlink reference signal received from an access node (500); means for selecting an antenna panel of the user equipment receiving the best quality downlink reference signal from a primary angular direction to be used for a connection to the access node (502); means for detecting a maximum permissible exposure (MPE) event (504); means for measuring, under MPE power restrictions, the best downlink reference signal received from the access node (506); means for determining that under the MPE power restrictions the best quality downlink reference signal is received at least from a different secondary angular direction than the primary angu-
(Continued)

lar direction of the best quality downlink reference signal (508); means for measuring a propagation delay difference between the best quality downlink reference signal received from the primary angular direction and the best quality downlink reference signal received from the secondary angular direction (510); and means for sending, upon detecting that the propagation delay difference exceeding a predetermined threshold, an indication to the access node (514).

1 Claim, 6 Drawing Sheets

(56) References Cited

U.S. PATENT DOCUMENTS

| | | | | |
|---|---|---|---|---|
| 12,610,325 | B2 * | 4/2026 | Luo | H04W 52/367 |
| 2016/0227505 | A1 | 8/2016 | Loehr et al. | |
| 2018/0278318 | A1 | 9/2018 | Chakraborty et al. | |
| 2019/0141692 | A1 | 5/2019 | Subramanian et al. | |
| 2020/0112926 | A1 | 4/2020 | Laghate et al. | |
| 2020/0145084 | A1 * | 5/2020 | Yan | H04B 7/0696 |
| 2020/0196265 | A1 | 6/2020 | Ryu et al. | |
| 2020/0229126 | A1 | 7/2020 | Soriaga et al. | |
| 2020/0267662 | A1 | 8/2020 | Godala et al. | |
| 2020/0280360 | A1 | 9/2020 | Bai et al. | |
| 2023/0156631 | A1 * | 5/2023 | Yang | H04W 52/365<br>370/318 |
| 2023/0284196 | A1 * | 9/2023 | Li | H04B 7/06952<br>370/329 |
| 2024/0014875 | A1 * | 1/2024 | Yuan | H04W 16/28 |
| 2024/0163835 | A1 * | 5/2024 | Thomas | H04W 64/00 |

OTHER PUBLICATIONS

"3rd Generation Partnership Project; Technical Specification Group Radio Access Network; NR; Physical layer procedures for control (Release 16)", 3GPP TS 38.213, V16.3.0, Sep. 2020, pp. 1-179.
"Discussion on enhancements for propagation delay compensation", 3GPP TSG RAN WG1 #103-e, R1-2008844, Agenda: 8.3.4, Nokia, Oct. 26-Nov. 13, 2020, 9 pages.
"Introduction of the P-MPR 2 bits report mapping in 38.133", 3GPP TSG-RAN WG4 Meeting #96-e, R4-2011736, InterDigital Inc, Aug. 17-28, 2020, 2 pages.
"Introduction of MPE related P-MPR operation in sub-clause 6.2. 4", 3GPP TSG-RAN WG4 Meeting #96-e, R4-2011735, InterDigital Inc, Aug. 17-28, 2020, 3 pages.
"Introduction of MPE reporting", 3GPP RAN WG2 Meeting #111-e, R2-2008595, InterDigital, Aug. 17-28, 2020, 6 pages.
"Introduction of MPE reporting", 3GPP RAN WG2 Meeting #111-e, R2-2008570, InterDigital, Aug. 17-28, 2020, 9 pages.
"IEEE Standard for Local and Metropolitan Area Networks—Timing and Synchronization for Time-Sensitive Applications", IEEE Computer Society, IEEE Std 802.1AS™, Jun. 19, 2020, 421 pages.
"3rd Generation Partnership Project; Technical Specification Group Radio Access Network; Evolved Universal Terrestrial Radio Access (E-UTRA); LTE Positioning Protocol (LPP (Release 16)", 3GPP TS 36.355, V16.0.0, Jul. 2020, pp. 1-8.
"3rd Generation Partnership Project; Technical Specification Group Radio Access Network; Evolved Universal Terrestrial Radio Access (E-UTRA); LTE Positioning Protocol A (LPPa (Release 16)", 3GPP TS 36.455, V16.1.0, Sep. 2020, pp. 1-88.
Simanic et al., "Compensation of asymmetrical latency for ethernet clock synchronization", IEEE International Symposium on Precision Clock Synchronization for Measurement, Control and Communication, Sep. 12-16, 2011, 6 pages.
"Recommended next steps for the NR specification related to MPE scenarios", 3GPP RAN4 WG Meeting #90, R4-1900220, Agenda: 6.1, Apple Inc, Feb. 25-Mar. 1, 2019, pp. 1-8.
"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.3.0, Dec. 2020, pp. 1-1084.
"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.
"3rd Generation Partnership Project; Technical Specification Group Radio Access Network; NG-RAN; F1 application protocol (F1AP) (Release 16)", 3GPP TS 38.473, V16.4.0, Jan. 2021, pp. 1-461.
Office action received for corresponding Finnish Patent Application No. 20215363, dated Sep. 28, 2021, 7 pages.
"Enhancements on Multi-beam Operation", 3GPP TSG-RAN WG1 Meeting #96-Bis, R1-1905027, Agenda: 7.2.8.3, Qualcomm Incorporated, Apr. 8-12, 2019, 26 pages.
"Moderator summary#2 for multi-beam enhancement: proposal categorization", 3GPP TSG RAN WG1 #102-e, R1-2007189, Agenda: 8.1.1, Samsung, Aug. 17-28, 2020, 27 pages.
"Enhancements on multi-beam operation in Rel-17", 3GPP TSG RAN WG1 Meeting #102-e, R1-2005246, Agenda: 8.1.1, Huawei, Aug. 17-28, 2020, 16 pages.
International Search Report and Written Opinion received for corresponding Patent Cooperation Treaty Application No. PCT/FI2021/050835, dated Mar. 3, 2022, 14 pages.
"Timing Resiliency for Rel-18", RAN Rel-18 Workshop, RWS-210115, Nokia, Jun. 28-Jul. 2, 2021, 8 pages.
Extended European Search Report received for corresponding European Patent Application No. 21934723.4, dated Feb. 11, 2025, 9 pages.

* cited by examiner

METHOD FOR DETERMINING PROPAGATION DELAYS

RELATED APPLICATION

This application was originally filed as a Patent Cooperation Treaty Application No. PCT/FI2021/050835 filed on Dec. 2, 2021, which claims priority from Finnish Provisional Application No. 20215363 filed on Mar. 29, 2021, both of which are hereby incorporated by reference in their entirety.

TECHNICAL FIELD

The present invention relates to determining propagation delays.

BACKGROUND

The Maximum Permissible Exposure (MPE) is the regulation on power density used, for example, for antenna radiation power of various wireless devices. The energy absorbed by the human body increases as the distance e.g. to an antenna panel of user equipment (UE) decreases. Therefore, to comply with the MPE limit, the UE may need to reduce its output power, if the distance between the user and the active panel gets too small. Therefore, every UE must have a proximity sensor implementation so as to be capable to detect whether a user/object is near its antenna panels.

Thus, a UE may be enforced to apply UE transmission (Tx) power back-off to comply with MPE when it is nearby a user. The reduced uplink (UL) transmission power may cause the UE to determine that it may obtain a better UL link budget by changing the currently used downlink (DL) beam to a secondary beam or a secondary antenna panel. The change is not necessarily required to be indicated to the network, and as a result, the MPE does not affect the DL link budget.

Consequently, an asymmetry of propagation delay in UL and DL is likely to become present, but this is not known by the network.

SUMMARY

Now, an improved method and technical equipment implementing the method has been invented, by which the above problems are alleviated. Various aspects include a method, an apparatus and a non-transitory computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided an apparatus comprising means for measuring a downlink reference signal received from an access node; means for selecting an antenna panel of the user equipment receiving the best quality downlink reference signal from a primary angular direction to be used for a connection to the access node; means for detecting a maximum permissible exposure (MPE) event; means for measuring, under MPE power restrictions, the best downlink reference signal received from the access node; means for determining that under the MPE power restrictions the best quality downlink reference signal is received at least from a different secondary angular direction than the primary angular direction of the best quality downlink reference signal; means for measuring that the power level of the best quality downlink reference signal received from the secondary angular direction is higher than the power level of the best quality downlink reference signal received from the primary angular direction; means for measuring a propagation delay difference between the best quality downlink reference signal received from the primary angular direction and the best quality downlink reference signal received from the secondary angular direction; and means for sending, upon detecting that the propagation delay difference exceeding a predetermined threshold, an indication to the access node.

According to an embodiment, said indication comprises the propagation delay difference measured as time difference of arrival (TDoA) of the downlink reference signal received from the primary angular direction and from the secondary angular direction.

According to an embodiment, said indication is sent in a Medium Access Control (MAC) layer Control Element (CE).

According to an embodiment, the apparatus comprises means for monitoring, prior to detecting the MPE event, if the best quality downlink reference signal is received from the secondary angular direction.

According to an embodiment, the downlink reference signal is a synchronization signal block (SSB), and the quality of the reference signal is measured as a reference signal received power (RSRP) level.

According to an embodiment, the downlink reference signal is a channel state information reference signal (CSI-RS), and the quality of the reference signal is measured as a reference signal received power (RSRP) level.

An apparatus according to a second aspect comprises at least one processor and at least one memory, said at least one memory stored with computer program code thereon, the at least one memory and the computer program code configured to, with the at least one processor, cause the apparatus at least to perform: measure a downlink reference signal received from an access node; select an antenna panel of the apparatus receiving the best quality downlink reference signal from a primary angular direction to be used for a connection to the access node; detect a maximum permissible exposure (MPE) event; measure, under MPE power restrictions, the best downlink reference signal received from the access node; determine that under the MPE power restrictions the best quality downlink reference signal is received at least from a different secondary angular direction than the primary angular direction of the best quality downlink reference signal; measure that the power level of the best quality downlink reference signal received from the secondary angular direction is higher than the power level of the best quality downlink reference signal received from the primary angular direction; measure a propagation delay difference between the best quality downlink reference signal received from the primary angular direction and the best quality downlink reference signal received from the secondary angular direction; and send, upon detecting that the propagation delay difference exceeding a predetermined threshold, an indication to the access node.

A method according to a third aspect comprises measuring, by a user equipment, a downlink reference signal received from an access node; selecting an antenna panel of the user equipment receiving the best quality downlink reference signal from a primary angular direction to be used for a connection to the access node; detecting, by the user equipment, a maximum permissible exposure (MPE) event; measuring, under MPE power restrictions, the best downlink reference signal received from the access node; determining that under the MPE power restrictions the best quality downlink reference signal is received at least from a different secondary angular direction than the primary angular direction of the best quality downlink reference signal; measuring that the power level of the best quality downlink reference signal received from the secondary angular direction is higher than the power level of the best quality downlink reference signal received from the primary angular direction; measuring a propagation delay difference between the best quality downlink reference signal received from the primary angular direction and the best quality downlink reference signal received from the secondary angular direction; and sending, upon detecting that the propagation delay difference exceeding a predetermined threshold, an indication to the access node.

An apparatus according to a fourth aspect comprises means for receiving an indication from a user equipment about a need to change an uplink beam of the user equipment, said indication comprising a propagation delay difference between a first downlink reference signal received from a primary angular direction and a second downlink reference signal measured after a detected MPE event from a different secondary angular direction different direction of arrival than the first downlink reference signal; and means for performing at least one action for compensating for asymmetry between an uplink path and a downlink path of the user equipment.

A method according to a fifth aspect comprises receiving an indication from a user equipment about a need to change an uplink beam of the user equipment, said indication comprising a propagation delay difference between a downlink reference signal received from a primary angular direction and a downlink reference signal measured after a detected MPE event from a different secondary angular direction; and performing at least one action for compensating for asymmetry between an uplink path and a downlink path of the user equipment.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which.

DETAILED DESCRIPTION OF SOME EXAMPLE EMBODIMENTS

The following describes in further detail suitable apparatus and possible mechanisms carrying out the operations for controlling propagation delays. While the following focuses on 5G networks, the embodiments as described further below are by no means limited to be implemented in said networks only, but they are applicable in any network and protocol entities requiring the control of propagation delays.

Figure 1:
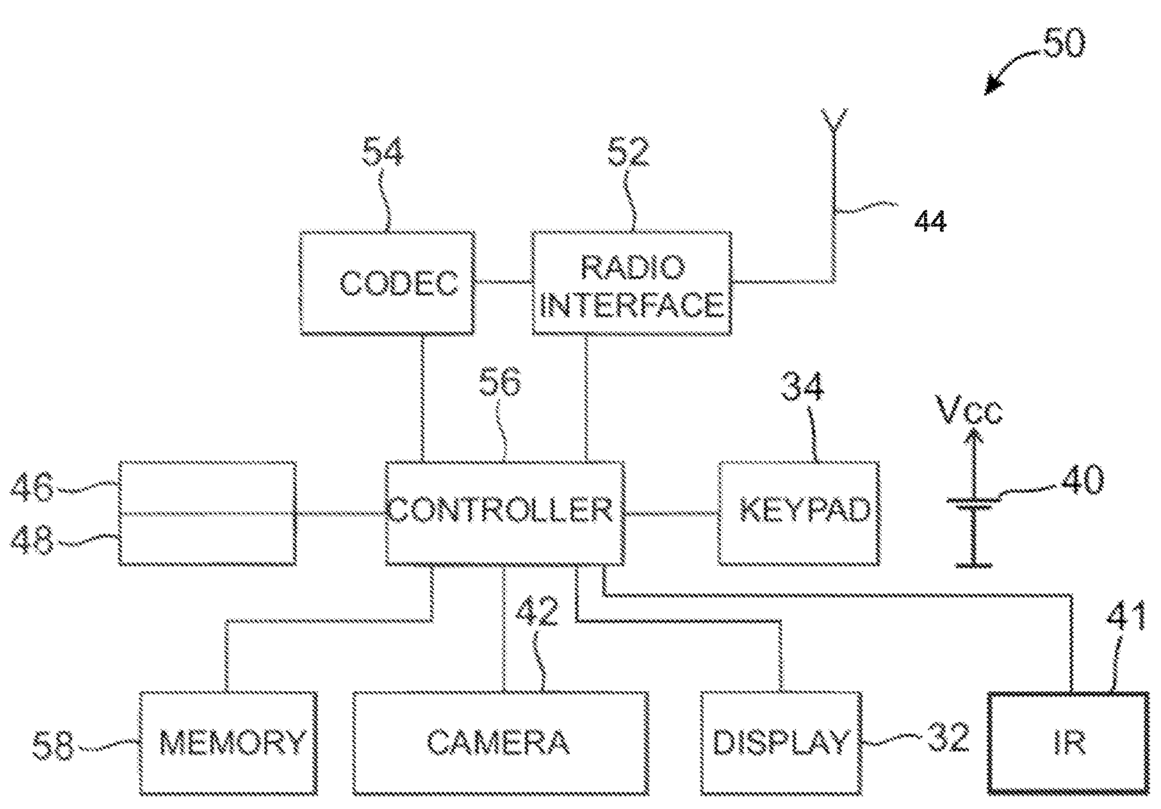
FIG. 1 shows a schematic block diagram of an apparatus for incorporating functionalities for implementing various embodiments.
Figure 2:
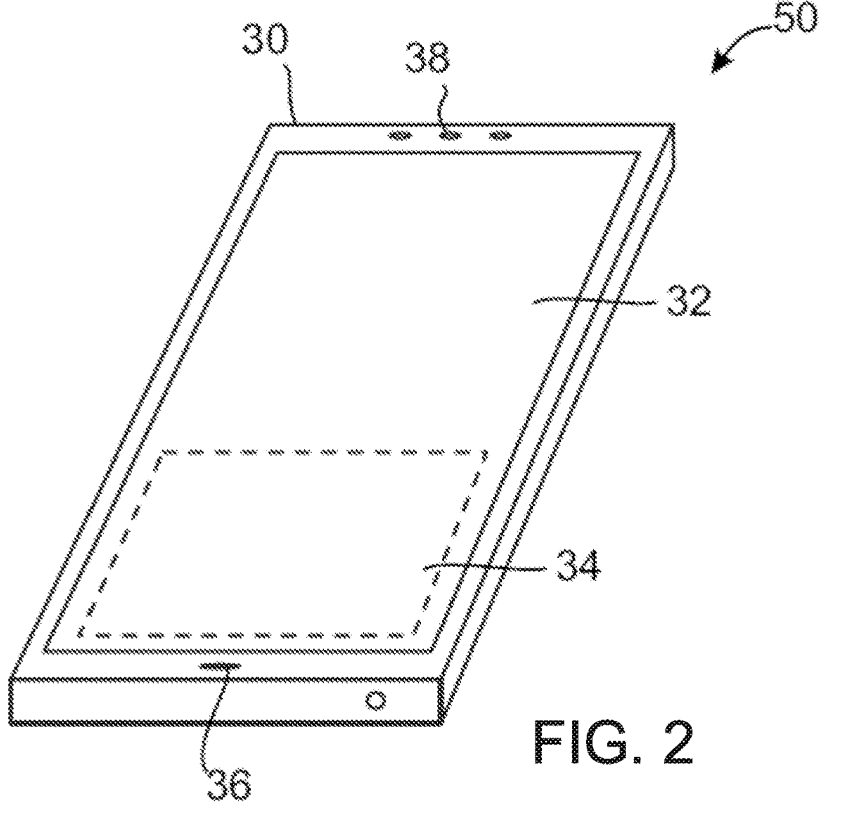
FIG. 2 shows schematically a layout of an apparatus according to an example embodiment.

In this regard, reference is first made to FIGS. 1 and 2, where FIG. 1 shows a schematic block diagram of an exemplary apparatus or electronic device 50, which may incorporate the arrangement according to the embodiments. FIG. 2 shows a layout of an apparatus according to an example embodiment. The elements of FIGS. 1 and 2 will be explained next.

The electronic device 50 may for example be a mobile terminal or user equipment of a wireless communication system. The apparatus 50 may comprise a housing 30 for incorporating and protecting the device. The apparatus 50 further may comprise a display 32 and a keypad 34. Instead of the keypad, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device, such as anyone of: an earpiece 38, speaker, or an analogue audio or digital audio output connection. The apparatus 50 may also comprise a battery 40 (or the device may be powered by any suitable mobile energy device such as solar cell, fuel cell or clockwork generator). The apparatus may further comprise a camera 42 capable of recording or capturing images and/or video. The apparatus 50 may further comprise an infrared port 41 for short range line of sight communication to other devices. In other embodiments the apparatus 50 may further comprise any suitable short-range communication solution such as for example a Bluetooth wireless connection or a USB/firewire wired connection.

The apparatus 50 may comprise a controller 56 or processor for controlling the apparatus 50. The controller 56 may be connected to memory 58 which may store both user data and instructions for implementation on the controller 56. The memory may be random access memory (RAM) and/or read only memory (ROM). The memory may store computer-readable, computer-executable software including instructions that, when executed, cause the controller/processor to perform various functions described herein. In some cases, the software may not be directly executable by the processor but may cause a computer (e.g., when compiled and executed) to perform functions described herein. The controller 56 may further be connected to codec circuitry 54 suitable for carrying out coding and decoding of audio and/or video data or assisting in coding and decoding carried out by the controller.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. A person skilled in the art appreciates that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 3:
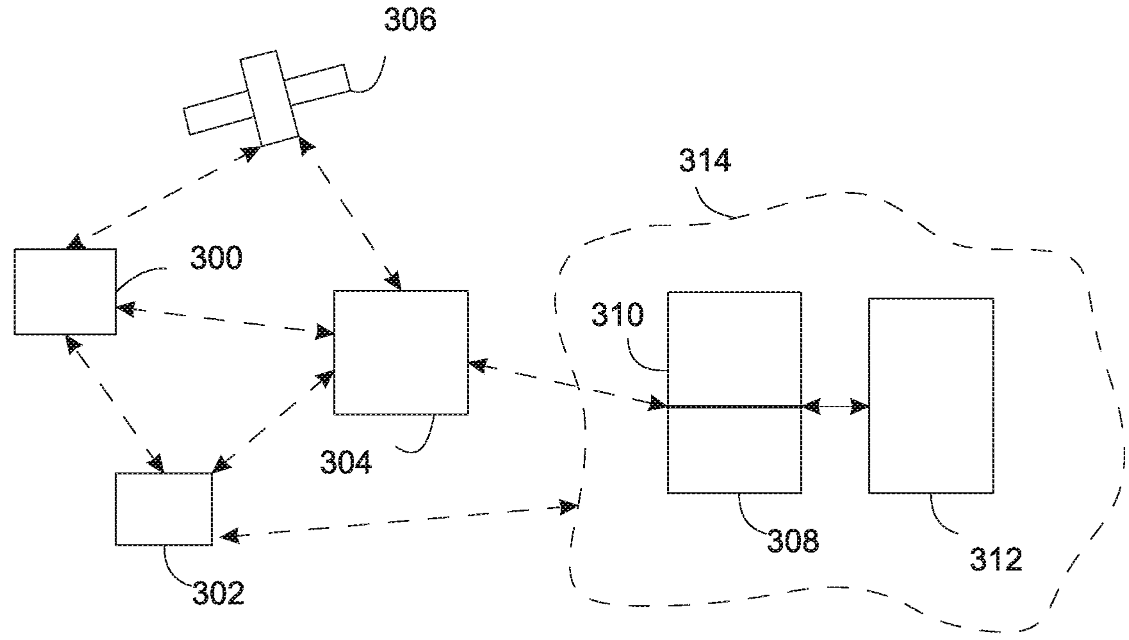
FIG. 3 shows a part of an exemplifying radio access network.

FIG. 3 depicts examples of simplified system architectures only showing some elements and functional entities, all being logical units, whose implementation may differ from what is shown. The connections shown in FIG. 3 are logical connections; the actual physical connections may be different. It is apparent to a person skilled in the art that the system typically comprises also other functions and structures than those shown in FIG. 3. The embodiments are not, however, restricted to the system given as an example but a person skilled in the art may apply the solution to other communication systems provided with necessary properties.

The example of FIG. 3 shows a part of an exemplifying radio access network.

FIG. 3 shows user devices 300 and 302 configured to be in a wireless connection on one or more communication channels in a cell with an access node (such as (e/g)NodeB) 304 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node (such as Integrated Access and Backhaul (LAB) node), host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 310 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access and Mobility Management Function (AMF).

In 5G NR, the User Plane Function (UPF) may be used to separate the control plane and the user plane functions. Therein, the Packet Gateway (PGW) control and user plane functions may be decoupled, whereby the data forwarding component (PGW-U) may be decentralized, while the PGW-related signaling (PGW-C) remains in the core. This allows packet processing and traffic aggregation to be performed closer to the network edge, increasing bandwidth efficiencies while reducing network.

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. The access nodes of the radio network form transmission/reception (TX/Rx) points (TRPs), and the UEs are expected to access networks of at least partly overlapping multi-TRPs, such as macro-cells, small cells, pico-cells, femto-cells, remote radio heads, relay nodes, etc. The access nodes may be provided with Massive MIMO antennas, i.e. very large antenna array consisting of e.g. hundreds of antenna elements, implemented in a single antenna panel or in a plurality of antenna panels, capable of using a plurality of simultaneous radio beams for communication with the UE. The UEs may be provided with MIMO antennas having an antenna array consisting of e.g. dozens of antenna elements, implemented in a single antenna panel or in a plurality of antenna panels. Thus, the UE may access one TRP using one beam, one TRP using a plurality of beams, a plurality of TRPs using one (common) beam or a plurality of TRPs using a plurality of beams.

The 4G/LTE networks support some multi-TRP schemes, but in 5G NR the multi-TRP features are enhanced e.g. via transmission of multiple control signals via multi-TRPs, which enables to improve link diversity gain. Moreover, high carrier frequencies (e.g., mmWaves) together with the Massive MIMO antennas require new beam management procedures for multi-TRP technology.

5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHz, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 312, or utilize services provided by them. The communication network may also be able to support the usage of cloud services, for example at least part of core network operations may be carried out as a cloud service (this is depicted in FIG. 3 by "cloud" 314). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU) and non-real time functions being carried out in a centralized manner (in a centralized unit, CU 308).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize non-terrestrial nodes 306, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPSs. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node 304 or by a gNB located on-ground or in a satellite.

A person skilled in the art appreciates that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

The Radio Resource Control (RRC) protocol is used in various wireless communication systems for defining the air interface between the UE and a base station, such as eNB/gNB. This protocol is specified by 3GPP in in TS 36.331 for LTE and in TS 38.331 for 5G. In terms of the RRC, the UE may operate in LTE and in 5G in an idle mode or in a connected mode, wherein the radio resources available for the UE are dependent on the mode where the UE at present resides. In 5G, the UE may also operate in inactive mode. In the RRC idle mode, the UE has no connection for communication, but the UE is able to listen to page messages. In the RRC connected mode, the UE may operate in different states, such as CELL_DCH (Dedicated Channel), CELL_FACH (Forward Access Channel), CELL_PCH (Cell Paging Channel) and URA_PCH (URA Paging Channel). The UE may communicate with the eNB/gNB via various logical channels like Broadcast Control Channel (BCCH), Paging Control Channel (PCCH), Common Control Channel (CCCH), Dedicated Control Channel (DCCH), Dedicated Traffic Channel (DTCH).

The transitions between the states is controlled by a state machine of the RRC. When the UE is powered up, it is in a disconnected mode/idle mode. The UE may transit to RRC connected mode with an initial attach or with a connection establishment. If there is no activity from the UE for a short time, eNB/gNB may suspend its session by moving to RRC Inactive and can resume its session by moving to RRC connected mode. The UE can move to the RRC idle mode from the RRC connected mode or from the RRC inactive mode.

5G specifications provide an option to split the internal structure of a gNB into entities called CU (Central Unit) and one or more DUs (Distributed Unit), which are connected by a F1 interface, as specified in 3GPP 38.473. The split may provide traffic aggregation in terms of one gNB CU serving a plurality of gNB DUs operating as the actual node points for the air interface. The split may be implemented, for example, such that the gNB CU comprises the PDCP (Packet Data Convergence Protocol) and the upper protocol layers and it also hosts the RRC, whereas the one or more DUs comprise the RLC (Radio Link Control) and the lower layers.

The actual user and control data from network to the UEs is transmitted via downlink physical channels, which in 5G include Physical downlink control channel (PDCCH) which carries the necessary downlink control information (DCI), Physical Downlink Shared Channel (PDSCH), which carries the user data and system information for user, and Physical broadcast channel (PBCH), which carries the necessary system information to enable a UE to access the 5G network.

The user and control data from UE to the network is transmitted via uplink physical channels, which in 5G include Physical Uplink Control Channel (PUCCH), which is used for uplink control information including HARQ feedback acknowledgments, scheduling request, and downlink channel-state information for link adaptation, Physical Uplink Shared Channel (PUSCH), which is used for uplink data transmission, and Physical Random Access Channel (PRACH), which is used by the UE to request connection setup referred to as random access.

For the 5G technology, one of the most important design goals has been improved metrics of reliability and latency, in addition to network resilience and flexibility. To meet the requirements of emerging applications such as intelligent transportation, augmented virtual reality, industrial automation, etc, three new service categories has been defined for 5G: enhanced mobile broadband (eMBB), massive machine-type communication (mMTC) and ultra-reliable low-latency communication (URLLC).

The two latest versions of the 5G standard, 3GPP Release 15 and 16, have built the physical implementation of URLLC to meet the two conflicting requirements of reliability and latency. The implementation includes e.g. higher subcarrier spacings and thus shorter OFDM symbol lengths (a.k.a. numerology), sub-slot transmission time intervals, and configured grant resources.

Whereas the previous 3GPP Releases have provided a relative synchronization between UE and the network, accurate time synchronization to an absolute time reference is a key addition in the 3GPP Release-16 in order to support Industrial IoT (IIoT) use-cases and, in particular, to support Time Sensitive Networking (TSN) or Time Sensitive Communications (TSC) applications. Time synchronization shall ensure that different nodes of a 5G network (e.g. UPF, gNB, UE) share the same Time of Day (ToD) clock, such as UTC clock. Later Release versions have introduced Time Resiliency Systems (TRS), which aim to provide a 5G system which is resilient to GNSS (Global Navigation Satellite System) loss and can act as a GNSS alternative. To this end, time synchronization accuracies down to 250 ns as end-to-end need to be provided while, at the same time, providing high accuracy positioning.

Many 5G modems integrated to IoT devices needing tight motion control, such as collaborative robotics, shall, on one hand, need time synchronization (in order to run deterministic communications for Ethernet protocols such as the IEEE Time Sensitive Networking) and, on the other hand, need high instant reliability requirements including adaptive tuning of antenna patterns when large or small scatterers move close to the device. Proximity sensors maybe used in such devices, and readings from such sensors may be used to adjust transmission from a given mm-wave antenna array module when a user may be in front of the module and power density may approach the MPE (Maximum Permissible Exposure) limit.

The Maximum Permissible Exposure (MPE) is the regulation on power density. The threshold for MPE, set by the Federal Communications Commission (FCC) for the general public, is 10 W/m2 (1 mW/cm2) between 6 and 100 GHz. The energy absorbed by the human body increases as the distance to the UE (antenna panel) decreases. Therefore, to comply with the MPE limit, the UE might have to reduce its output power, if the distance between the user and the active panel gets too small. Because of mandatory compliance to FCC regulations, a 5G UE supporting mmWave operation must be capable to detect whether a user/object is near its antenna panels, if it can be configured to transmit with power level above the power limit level for MPE.

Such UE must have a proximity sensor implementation, as the MPE is mandatory. The most common proximity sensor implementations in UEs are:

- Capacitive Sensor: This is a static proximity sensor used extensively in laptops and tablets supporting LTE functionality. It can monitor the changes in the electrical field near a relatively large (≈1 cm2) open capacitor structure and relate the detected changes to a pre-calibrated distance.
- Infrared Sensor: This is also a static proximity sensor used at least on some of the 5G NR mmWave devices currently available. It monitors the heat signature from a user and can be implemented with an area opening on the surface of the device of approximately 0.5 cm2.
- Dedicated Radar Sensor: The radar functionality is used in many other applications and is a known and well documented technique to measure the distance to an object. Some radar types may be able to distinguish between different types of objects, such as between users and object blockage.
- Using the UE mmWave antenna panel as a radar: The radar functionality is embedded into the antenna array to save space on the PCB.

Due to the dynamic nature of the radio link, it is challenging to deliver time synchronization over Uu interface from gNB to UE. Using the 5G NR control plane, time synchronization information (i.e. gNB clock) can be delivered from a gNB to serve UEs using two methods: 1) a broadcast method where the time information is encoded in a SIB9 (System Information Block, type 9) message, 2) a unicast method where the time information is encoded in a unicast RRC message. In both methods, the encoded time information is gNB's clock time that corresponds to the ending boundary of a specific radio system frame (refSFN), where refSFN is indicated to the UE either implicitly (in case of broadcast) or explicitly (in case of unicast). When a UE receives the SIB9/ RRC message, it associates the time information with its own refSFN boundary, which is aligned with the gNB's refSFN boundary. In this way, the underlying 5G radio frame timing at gNB and UE is used as a common reference for delivery of ToD clock.

A challenge in using the underlying 5G radio frame timing at gNB and UE as a common reference for delivery of ToD clock is that radio frame boundaries (i.e. refSFN boundaries) at gNB and UE are not perfectly aligned in time with respect to one another. Even if the UE synchronizes its receiver to the PSS/SSS (Primary/Secondary Synchronization Signal), the downlink frame boundary at UE is shifted by the propagation delay (PD) (i.e. by the time it takes for radio frame to propagate from gNB to UE over the air) with respect to the corresponding frame boundary at gNB. When a UE synchronizes its clock by associating time information carried by SIB9/RRC message with its own refSFN boundary, its clock will be delayed by the PD compared to gNB's clock. This may not be an issue in data communications or if PD is relatively small compared to the maximum allowed timing error (every 10 m of distance adds 33.3 ns of time error between UE and gNB clocks due to PD). However, if that the maximum synchronization error over 5G RAN shall be less than 250 ns and, at the same time, the distance of the UE from the gNB may be such that PD alone would introduce a much larger error, mechanisms to compensate for this offset are needed. Therefore, UE needs to compensate the time information received in SIB9/RRC message for the PD, for example by adding its current PD estimate to the time information.

Acquisition of a PD estimation requires a round trip time (RTT) measurement. This can either be obtained through the positioning framework (Rx-Tx measurements) or through the UE timing advance TA, which is a metric of how much the UE UL transmission should occur relative to the DL reception time. The RTT is measured as the sum of propagation delay in DL and the propagation delay in UL. The RTT estimation is the only viable technique to estimate DL propagation delay, where the DL PD is estimated by RTT/2, and hence with the underlying assumption of symmetric PD (i.e. UL PD=DL PD).

Regarding the accuracy of synchronization over a single user-plane interface, an error model has been derived on TA (Timing Advance) when used for PD compensation as:

$$TE_{Uu\text{-}PD\text{-}compensated\text{-}TA} = \tfrac{1}{2}TE_{UE\text{-}DL\text{-}RX} + \tfrac{1}{2}(d_{PD\text{-}DL} - d_{PD\text{-}UL}) - \tfrac{1}{2}TE_{gN\text{-}UL\text{-}RX} - \tfrac{1}{2}TE_{Te} - \tfrac{1}{2}TE_{TA\text{-}C} - TE_{SFN\text{-}to\text{-}AI},$$

where $TE_{UE\text{-}DL\text{-}RX}$ is the UE DL CIR peak detection accuracy, $TE_{gNB\text{-}UL\text{-}RX}$ is the gNB UL CIR peak detection accuracy, $d_{PD\text{-}DL}$ and $d_{PD\text{-}UL}$ is the downlink/uplink propagation delay, $TE_{Te}$ is the maximum initial transmit timing error, $TE_{TA\text{-}C}$ is the timing error caused by the granularity of the timing advance command and $TE_{SFN\text{-}to\text{-}AI}$ is the error between the System Frame Number (SFN) timestamp in referenceTimeInfo-r16 IE and the actual air interface frame timing at the gNB. The possible asymmetry or the difference in propagation delay in UL and DL is introduced by the term $\tfrac{1}{2}(d_{PD\text{-}DL} - d_{PD\text{-}UL})$.

As described above, a UE with proximity sensors and when operating in FR2, may be enforced to apply UE Tx power back-off to comply with MPE when it is nearby a user. Depending on the capability of the proximity sensor, the UE may or may not be able to differentiate an object from a user. Thus, the UE may trigger MPE e.g. due to a detected human, table, wall, robot and hence drastically reduce its UL transmission power on its serving beam. The reduced UL transmission power may cause the UE to determine that it may obtain a better UL link budget by changing only the Tx beam to a secondary beam or a secondary antenna panel. The change is not necessarily required to be indicated to the gNB, and as a result, the MPE might not affect the DL link budget. Consequently, an asymmetry of propagation delay in UL and DL is likely to become present, but this is not known by the network.

Figure 4A:
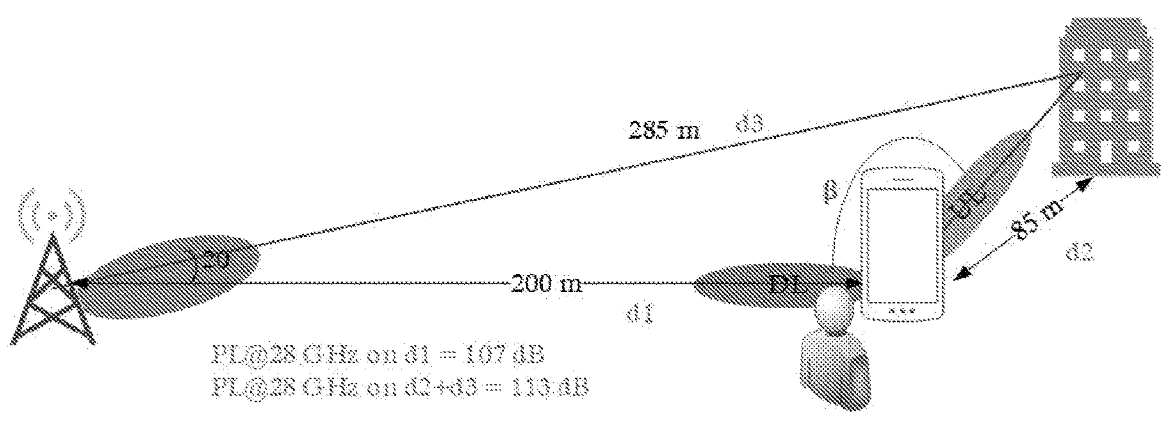
FIGS. 4*a* and 4*b* illustrate examples of asymmetry of transmission beam path and reception beam path of a user equipment due to MPE.
Figure 4B:
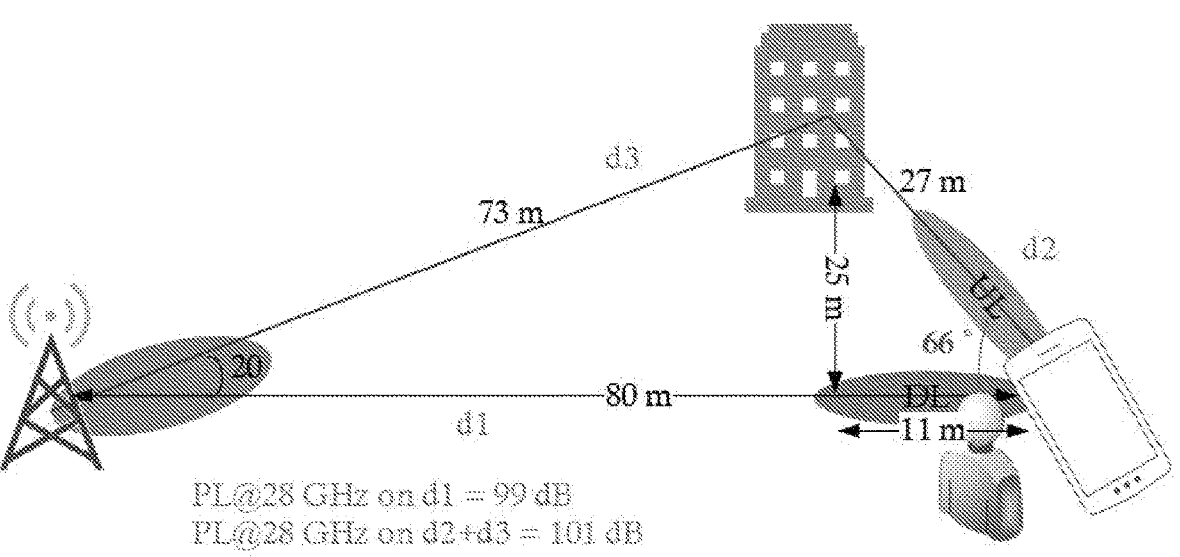

FIGS. 4*a* and 4*b* show two examples of asymmetry caused by the UE changing its UE Tx beam path to be different from the UE Rx beam path due to MPE. In FIG. 4*a*, the MPE, triggered e.g. by the proximity of the user of the UE, causes the UL path of the Tx beam to be changed so as to be reflected from a building, thereby resulting in a total DL path of 370 m. At the same time, the DL path of the Rx beam is 200 m. In FIG. 4*b*, the MPE causes the UL path of the Tx beam again to be reflected from a building, thereby resulting in a total DL path of 100 m, while the DL path of the Rx beam is 80 m. The change of UL Tx beam cause an additional UL propagation path compared to the DL path of respectively 170 m and 20 m for the two cases. This corresponds to an asymmetry of 510 ns and 60 ns, respectively. The requirements of accurate time synchronization down to 250 ns as end-to-end cannot be fulfilled in the example case of FIG. 4*a*.

Therefore, it would be preferable to have a procedure for enabling the network to compensate for the propagation delays caused by an MPE event faster.

In the following, an enhanced method for propagation delay indications will be described in more detail, in accordance with various embodiments.

Figure 5:
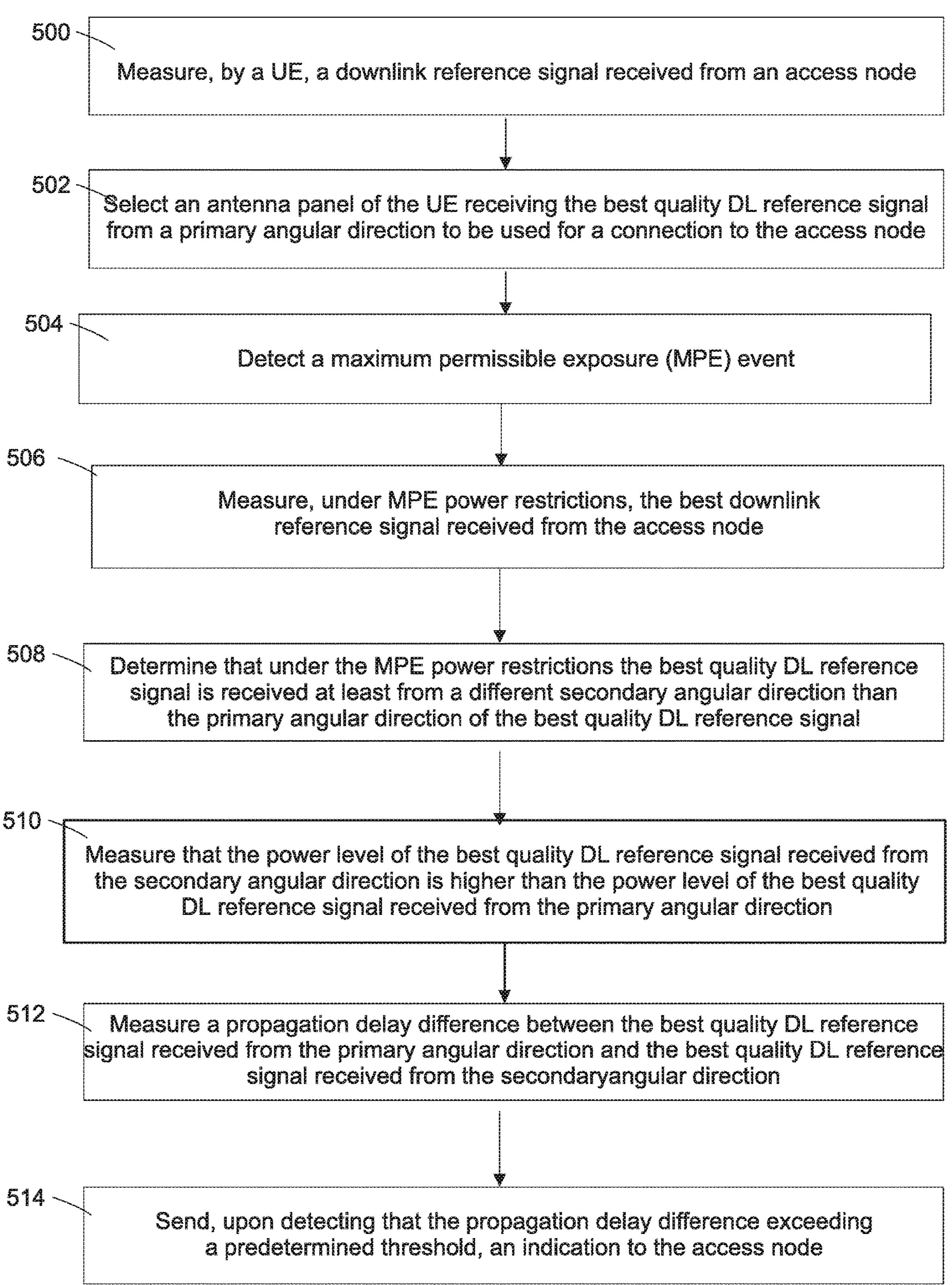
FIG. 5 shows a flow chart for the operation of a terminal apparatus according to an embodiment.

The method is disclosed in a flow chart of FIG. 5 as reflecting the operation of a terminal apparatus, for example a user equipment (UE), wherein the method comprises measuring (500), by a user equipment, a downlink reference signal received from an access node; selecting (502) an antenna panel of the user equipment receiving the best quality downlink reference signal from a primary angular direction to be used for a connection to the access node; detecting (504), by the user equipment, a maximum permissible exposure (MPE) event; measuring (506), under MPE power restrictions, the best downlink reference signal received from the access node; determining (508) that under the MPE power restrictions the best quality downlink reference signal is received at least from a different secondary angular direction than the primary angular direction of the best quality downlink reference signal; measuring (510) that the power level of the best quality downlink reference signal received from the secondary angular direction is higher than the power level of the best quality downlink reference signal received from the primary angular direction; measuring (512) a propagation delay difference between the best quality downlink reference signal received from the primary angular direction and the best quality downlink reference signal received from the secondary angular direction; and sending (514), upon detecting that the propagation delay difference exceeding a predetermined threshold, an indication to the access node.

Thus, the UE carries out its regular beam management operations and scans for the downlink reference signals from one or more access nodes of the network using a plurality of antenna panels. The panel receiving the best quality reference signal is selected as the active panel to be used to establish and/or keep the connection to the access node, such as the serving gNB. Upon detecting an MPE event, the maximum allowed output power at the UE is reduced to a predetermined level, and the UE carries out the scanning of the downlink reference signals under MPE restrictions. Now, if the best quality reference signal is detected to be received from a different angular direction than the direction of the originally received best quality reference signal, it may be an indication that the UE may obtain a better link budget for uplink by changing its transmission beam or its transmission antenna panel. The UE measures the propagation delay difference between the originally received best quality reference signal from the primary angular direction and the best quality reference signal received from the secondary angular direction, which could be measured under the MPE restrictions, and if the difference exceeds a threshold value, it is an indication that the best quality reference signal received from the secondary angular direction for the uplink beam is traveling a different path in the environment than the best quality reference signal received from the primary angular direction. However, before changing its uplink transmission beam/panel, the UE sends an indication about the need to change the uplink beam of the UE to the access node, such as the serving gNB. Thus, the network is made aware that there will be asymmetry in the link budgets and propagation delays of the downlink and the uplink connections of the UE due to a detected MPE. The network may then carry out necessary actions for compensating the asymmetry.

According to an embodiment, the method comprises determining if the difference of power levels of the best quality downlink reference signal received from the secondary angular direction and primary angular direction exceeds a predetermined threshold value. Thus, the UE may measure the power level of the best quality downlink reference signal received from the secondary and the primary angular directions, for example, in terms of reference signal received power (RSRP) level, wherein a sufficient difference level may indicate that an alternative link with better link budget may be found for the UL beam.

According to an embodiment, said indication comprises the propagation delay difference measured as time difference of arrival (TDoA) of the same downlink reference signal received from the primary angular direction and from the secondary angular direction. Thus, the network is made aware of an asymmetry value, which enables the network to compensate for the asymmetry in its propagation delay.

According to an embodiment, said indication is sent in a Medium Access Control (MAC) layer Control Element (CE). Thus, a new MAC CE message may be introduced to report the measured PD difference to the network. It is, however, noted that the indication may be sent as an RRC message, or using an UCI (Uplink Control Information) framework for sending the message.

According to an embodiment, the downlink reference signal is a synchronization signal block (SSB), and the quality of the reference signal is measured as a reference signal received power (RSRP) level.

According to an embodiment, the downlink reference signal is a channel state information reference signal (CSI-RS), and the quality of the reference signal is measured as a reference signal received power (RSRP) level.

Hence, the UE may utilise the regular beam management measurements in detecting and carrying out the propagation delay measurements.

According to an embodiment, the method further comprises monitoring, prior to detecting the MPE event, if the currently best quality downlink reference signal is received from a different, i.e. the secondary, angular direction. Thus, the same antenna panel receiving the best quality first downlink reference signal may afterwards receive the same reference signal from a different angular direction. Then upon detecting the MPE event, the quality of the reference signal from the different angular direction will also be affected by the blockage of the user/object causing the MPE event and adjusted automatically due to the panel being affected by the same blockage.

Figure 6:
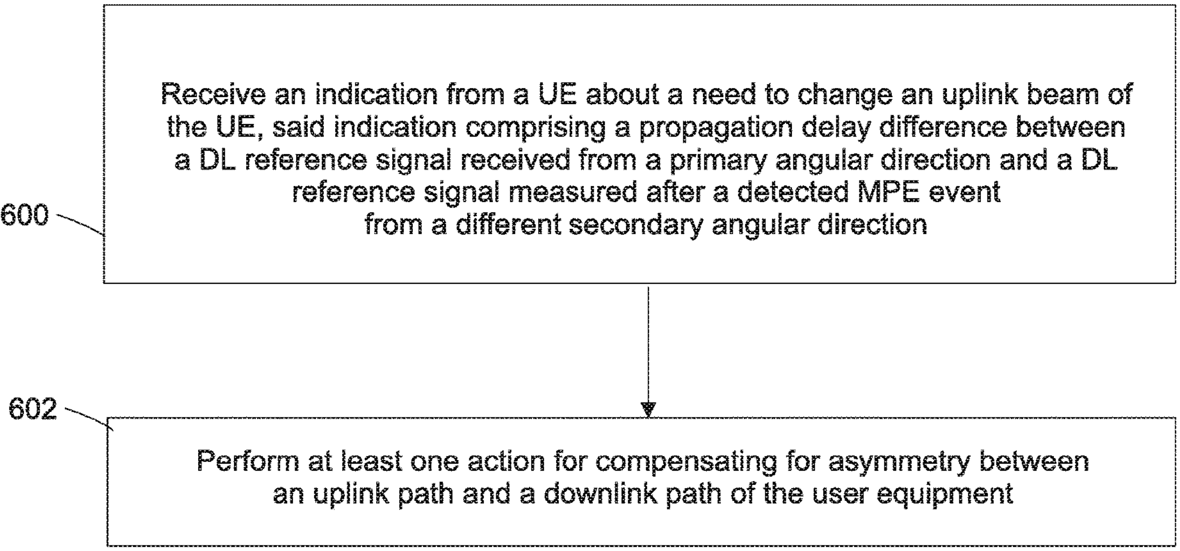
FIG. 6 shows a flow chart for the operation of a network access node according to an embodiment.

Another aspect relates to the operation of a network element, such as an access point or a base station of a radio access network, e.g. an eNB or a gNB. The flow chart of FIG. 6 reflects the operation of such network element following the operation of the UE as described above, i.e. upon receiving the indication.

The method comprises receiving (600) an indication from a user equipment about a need to change an uplink beam of the user equipment, said indication comprising a propagation delay difference between a first downlink reference signal and a second downlink reference signal measured after a detected MPE event from a different direction of arrival than the first downlink reference signal; and performing (602) at least one action for compensating for asymmetry between an uplink path and a downlink path of the user equipment.

According to an embodiment, the method comprises signalling an asymmetry value based on the propagation delay difference to a Location Management Function (LMF) of the network.

Thus, the gNB may signal the propagation delay difference or an asymmetry value deduced from the propagation delay difference to the Location Management Function (LMF) such that it can compensate for the asymmetry in its PD estimation and positioning estimations. The gNB may not be aware of whether the LMF needs this signalling, and the gNB may be configured to report the asymmetry in all circumstances.

According to an embodiment, the method comprises applying a pre-compensation for the asymmetry value in a propagation delay compensation procedure. The gNB may be configured to conduct PD compensation on behalf of the UE. Thus, the gNB may apply a pre-compensation for the asymmetry value in the PD compensation procedure used for accurate time synchronization. The gNB may carry out the pre-compensation, for example, as the pre-compensation of the timestamp in referenceTimeInfo-r16. In case of the split internal structure of the gNB, the pre-compensation may be carried out in a gNB-DU.

According to an embodiment, the method comprises signalling the pre-compensation for the asymmetry value to the user equipment. The gNB may signal the pre-compensation for the asymmetry value to the UE, and the UE may then directly apply the pre-compensation for the asymmetry value.

According to an embodiment, the method comprises signalling the user equipment with the asymmetry value. Thus, the gNB may signal the UE with the asymmetry value, and the UE may determine the pre-compensation and apply it for the asymmetry value.

According to an embodiment, the method comprises initiating a Sounding Reference Signal (SRS) sweep to perform CSI measurements for link adaptation. The gNB may choose this action if it considers that a better quality uplink beam can be identified than the originally targeted uplink beam. The better quality may be evaluated e.g. in terms of the UL Tx beam having a better link budget or less asymmetry than the target UL Tx beam.

Figure 7:
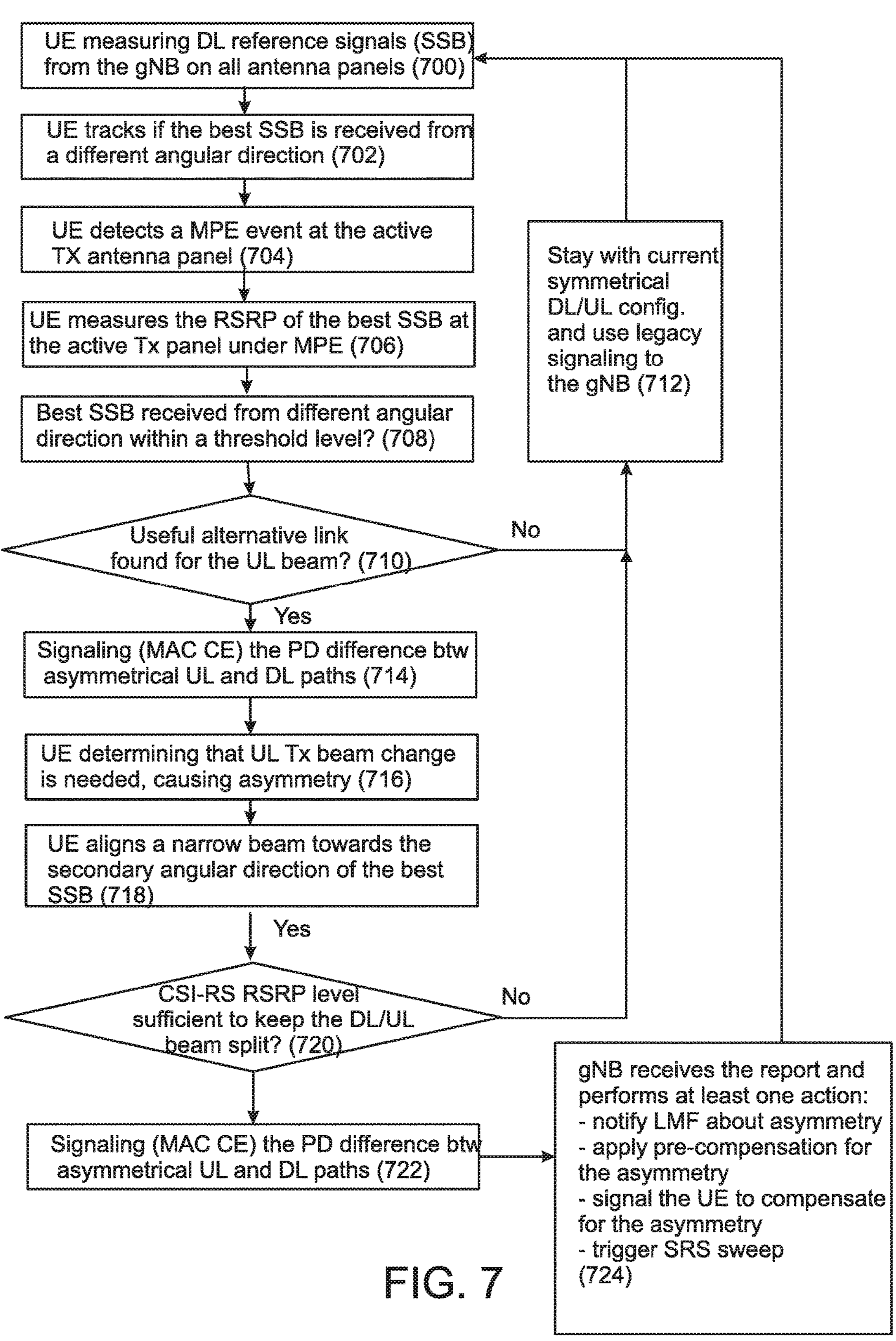
FIG. 7 shows a flow chart for illustrating various embodiments relating to a method for propagation delay indications.

The above methods and various embodiments related thereto are illustrated by a flow chart of FIG. 7 as reflecting the operation of a terminal apparatus, such as the UE. The UE carries out its regular beam management operations, and thereby periodically scans (700) for synchronization signal blocks (SSB) from one or more access nodes of the network on all its panels to get an overview of the current conditions of the surrounding environment. Some UEs may be able to make such measurements simultaneously for a plurality of panels, while other UEs will have to do this sequentially on all their panels. The panel that receives the highest reference signal received power (RSRP) level from the SSBs will be selected as the active panel, which is used to establish/keep the connection to the serving gNB.

The UE continues the SSB monitoring so as to track (702) if it receives the best SSB on any panel from a different angular direction. This can be performed, for example, by analysing the Power Delay Profile (PDP) of a particular SSB on each panel individually.

Upon the UE detecting (704) an MPE event on the active Tx panel, which may be triggered by the proximity sensors required on each panel, the UE measures (706) the RSRP levels of the best SSB on the active panel while under MPE restrictions.

The UE compares (708) the RSRP level of the best SSB received on the active panel while under MPE restrictions, with the RSRP level of the same SSB received on any panel from a different angular direction as detected in step 702 above. It is noted that the best SSB from a different angular direction may already be received in step 700, i.e. on the same panel where the best SSB is also received. Thus, the RSRP of said SSB may have been affected by the blockage of the user/object and adjusted automatically, since the RSRP measurement is done while the panel is affected by the same blockage.

The UE then determines (710) if any of the difference levels obtained from the comparison exceeds a predefined threshold; in other words, is there any suitable alternative link found for the UL beam.

If no suitable alternative link is found for the UL beam, the UE will stay (712) with the current symmetrical DL/UL configuration and continue sending legacy timing reports to the serving gNB and thereby indirectly to the LMF.

If a suitable alternative link is found for the UL beam, the UE informs (714) the serving gNB about the imbalance in the propagation paths for DL and UL, thereby causing a need to reconfigure DL/UL beam split at the UE. In the signalling, a new MAC CE (Control Element) may be used, where the UE will report the measured PD difference between the source and target UL Tx beam. It is noted that the RRC framework and the UCI framework may be used as alternatives for the signaling.

In addition, said message may preferably be sent to the serving gNB as soon as the UL/DL beam split have been initiated. The UE will most likely send the first messages on broader beams until the gNB have scheduled sufficient aperiodic channel state information reference signal (CSI-RS) with repetition set as 'ON' for the UE to complete its narrow beam alignment.

The UE determines (716) that an UL beam change is needed and selects the best panel for this change, knowing that this will cause asymmetry between the DL and the UL propagation paths. The UE then aligns (718) its narrow UL beam towards the different angular direction of the best SSB. The UE may utilize the aperiodic CSI-RS with repetition 'ON' scheduled by the gNB in order to perform the alignment. The UE may have to use a wider UL beam until the alignment of the narrower UL beam is completed.

The UE will measure the RSRP level of the aperiodic CSI-RS with repetition 'ON' on the MPE restricted narrower beam used for DL and compare it to the RSRP level of the different narrow beam used for UL. Based on the comparison, the UE determines (720) if the difference in RSRP level exceeds a predefined threshold; in other words, is the CSI-RS level sufficient to keep the UL/DL beam split according to the newly aligned narrower UL beam.

If the CSI-RS level is not sufficient, the UE will stay (712) with the current symmetrical DL/UL configuration and continue sending legacy timing reports to the serving gNB and thereby indirectly to the LMF.

If the CSI-RS level is sufficient, the UE informs (722) the serving gNB about the imbalance in the propagation paths for DL and UL, for example using the new MAC CE for reporting the measured PD difference between the source and target UL Tx beam, or carry out the signaling using the RRC/UCI framework.

In FIG. 7, the step 724 describes the operation of an access point or a base station of a radio access network, such as an eNB or a gNB. The access point, such as the gNB, receives the report and carries out at least one of a plurality of predefined actions based on the measured PD difference between the source and target UL Tx beam.

The plurality of predefined actions to be conducted by the gNB when receiving the report from the UE may comprise signalling the asymmetry value to the Location Management Function (LMF) such that it can compensate for the asymmetry in its PD estimation and positioning estimations. The gNB may not be aware of whether the LMF needs this signalling, and thus according to an embodiment, the gNB may be configured to report the asymmetry in all circumstances.

The gNB may be configured to conduct PD compensation on behalf of the UE. Thus, the plurality of predefined actions to be conducted by the gNB when receiving the report from the UE may comprise applying a pre-compensation for the asymmetry value in the PD compensation procedure used for accurate time synchronization. The gNB may carry out the pre-compensation, for example, as the pre-compensation of the timestamp in referenceTimeInfo-r16. In case of the split internal structure of the gNB, the pre-compensation may be carried out in a gNB-DU.

The plurality of predefined actions to be conducted by the gNB when receiving the report from the UE may comprise the gNB signalling the pre-compensation for the asymmetry value to the UE. The UE may then directly apply the pre-compensation for the asymmetry value.

The plurality of predefined actions to be conducted by the gNB when receiving the report from the UE may comprise the gNB signalling the UE with the asymmetry value. The UE may determine the pre-compensation and apply it for the asymmetry value.

Alternatively, the UE may be configured to autonomously compensate for the causes of the asymmetry.

The plurality of predefined actions to be conducted by the gNB when receiving the report from the UE may comprise initiating an A-SRS sweep. The gNB may choose this action if it judges that an alternative UL Tx beam can be identified which e.g. has a better link budget or less asymmetry than the target UL Tx beam.

The first method described above and the embodiments related thereto may be implemented in an apparatus implementing a user equipment (UE). The apparatus may comprise at least one processor and at least one memory, said at least one memory stored with computer program code thereon, the at least one memory and the computer program code configured to, with the at least one processor, cause the apparatus at least to perform: measure a downlink reference signal received from an access node; select an antenna panel of the apparatus receiving the best quality downlink reference signal from a primary angular direction to be used for a connection to the access node; detect a maximum permissible exposure (MPE) event; measure, under MPE power restrictions, the best downlink reference signal received from the access node; determine that under the MPE power restrictions the best quality downlink reference signal is received at least from a different secondary angular direction than the primary angular direction of the best quality downlink reference signal; measure that the power level of the best quality downlink reference signal received from the secondary angular direction is higher than the power level of the best quality downlink reference signal received from the primary angular direction; measure a propagation delay difference between the best quality downlink reference signal received from the primary angular direction and the best quality downlink reference signal received from the secondary angular direction; and send, upon detecting that the propagation delay difference exceeding a predetermined threshold, an indication to the access node.

Such an apparatus may likewise comprise: means for measuring a downlink reference signal received from an access node; means for selecting an antenna panel of the user equipment receiving the best quality downlink reference signal from a primary angular direction to be used for a connection to the access node; means for detecting a maximum permissible exposure (MPE) event; means for measuring, under MPE power restrictions, the best downlink reference signal received from the access node; means for determining that under the MPE power restrictions the best quality downlink reference signal is received at least from a different secondary angular direction than the primary angular direction of the best quality downlink reference signal; means for measuring that the power level of the best quality downlink reference signal received from the secondary angular direction is higher than the power level of the best quality downlink reference signal received from the primary angular direction; means for measuring a propagation delay difference between the best quality downlink reference signal received from the primary angular direction and the best quality downlink reference signal received from the secondary angular direction; and means for sending, upon detecting that the propagation delay difference exceeding a predetermined threshold, an indication to the access node.

The second method and the embodiments related thereto may be implemented in an apparatus implementing an access point or a base station of a radio access network, such as an eNB or a gNB. An apparatus, such as a gNB, according to an aspect comprises means for receiving an indication from a user equipment about a need to change an uplink beam of the user equipment, said indication comprising a propagation delay difference between a downlink reference signal received from a primary angular direction and a downlink reference signal measured after a detected MPE event from a different secondary angular direction; and means for performing at least one action for compensating for asymmetry between an uplink path and a downlink path of the user equipment.

An apparatus, such as an access point or a base station of a radio access network, e.g. an eNB or a gNB, according to a further aspect comprises at least one processor and at least one memory, said at least one memory stored with computer program code thereon, the at least one memory and the computer program code configured to, with the at least one processor, cause the apparatus at least to perform: receive an indication from a user equipment about a need to change an uplink beam of the user equipment, said indication comprising a propagation delay difference between a downlink reference signal received from a primary angular direction and a downlink reference signal measured after a detected MPE event from a different secondary angular direction; and perform at least one action for compensating for asymmetry between an uplink path and a downlink path of the user equipment.

Such apparatuses may comprise e.g. the functional units disclosed in any of the FIGS. 1-3 for implementing the embodiments.

A further aspect relates to a computer program product, stored on a non-transitory memory medium, comprising computer program code, which when executed by at least one processor, causes an apparatus at least to perform: measure a downlink reference signal received from an access node; select an antenna panel of the apparatus receiving the best quality downlink reference signal from a primary angular direction to be used for a connection to the access node; detect a maximum permissible exposure (MPE) event; measure, under MPE power restrictions, the best downlink reference signal received from the access node; determine that under the MPE power restrictions the best quality downlink reference signal is received at least from a different secondary angular direction than the primary angular direction of the best quality downlink reference signal; measure that the power level of the best quality downlink reference signal received from the secondary angular direction is higher than the power level of the best quality downlink reference signal received from the primary angular direction; measure a propagation delay difference between the best quality downlink reference signal received from the primary angular direction and the best quality downlink reference signal received from the secondary angular direction; and send, upon detecting that the propagation delay difference exceeding a predetermined threshold, an indication to the access node.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. A user equipment comprising:

a plurality of antenna panels;

a plurality of proximity sensors comprising a proximity sensor on each antenna panel of the plurality of antenna panels, each proximity sensor comprising a dedicated radar sensor configured to measure distance to an object and to distinguish between different types of objects;

at least one processor; and at least one memory, said at least one memory stored with computer program code thereon, the at least one memory and the computer program code configured to, with the at least one processor, cause the user equipment at least to perform:

measure a plurality of downlink reference signals received from an access node by analyzing a power delay profile (PDP) of a synchronization signal block (SSB) on each antenna panel of the plurality of antenna panels individually;

select a first antenna panel of the plurality of antenna panels receiving a best quality downlink reference signal, of the plurality of downlink reference signals, from a primary angular direction to be used for a connection to the access node;

trigger a maximum permissible exposure (MPE) event in response to the proximity sensor of the first antenna panel detecting a robot;

measure, under MPE power restrictions, the best downlink reference signal received from the access node on any antenna panel of the plurality of antenna panels from angular directions different from the primary angular direction;

determine that under the MPE power restrictions the best quality downlink reference signal is received at a second antenna panel, of the plurality of antenna panels, at least from a secondary angular direction different from the primary angular direction;

measure that a power level of the best quality downlink reference signal received at the second antenna panel from the secondary angular direction is higher than a power level of the best quality downlink reference signal received at the first antenna panel from the primary angular direction by a predefined threshold;

measure a propagation delay difference between the best quality downlink reference signal received at the first antenna panel from the primary angular direction and the best quality downlink reference signal received at the second antenna panel from the secondary angular direction;

send, upon detecting that the propagation delay difference exceeds a predetermined threshold, an indication to the access node, wherein said indication comprises the propagation delay difference measured as time difference of arrival (TDoA) of the downlink reference signals received from the primary angular direction and from the secondary angular direction, wherein said indication is in a Medium Access Control (MAC) layer Control Element (CE), wherein the downlink reference signals comprise a synchronization signal block (SSB), and the quality of the downlink reference signals is measured as a reference signal received power (RSRP) level;

wherein the computer program code configured to, with the at least one processor, further cause the user equipment at least to perform:

determine that uplink transmission beam change is needed;

align a narrow uplink beam towards the secondary angular direction of the best quality downlink reference signal by utilizing aperiodic channel state information reference signal (CSI-RS) with repetition 'ON' scheduled by the access node and by using a wider uplink beam until alignment of the narrow uplink beam is completed;

determine a difference between an RSRP of the aperiodic CSI-RS with repetition 'ON' on a MPE restricted narrower beam used for downlink and an RSRP of the narrow uplink beam used for uplink;

based on the difference in RSRP exceeding a predefined threshold:

determine that level of the CSI-RS is sufficient to keep an uplink/downlink beam split according to the aligned narrow uplink beam; and inform the access node about imbalance in propagation paths for downlink and uplink by using the MAC CE for reporting a measured propagation difference between the source uplink transmit beam and the target uplink transmit beam.

* * * * *